United States Patent [19]

Minakuchi et al.

[11] Patent Number: 5,357,163
[45] Date of Patent: Oct. 18, 1994

[54] MOTOR WITH DYNAMIC-PRESSURE TYPE BEARING DEVICE

[75] Inventors: Shinichi Minakuchi, Iyo; Nobuhiro Yoshino, Oozu, both of Japan

[73] Assignee: Matsushita Electric Industrial Co., Ltd., Osaka, Japan

[21] Appl. No.: 57,388

[22] Filed: May 6, 1993

[30] Foreign Application Priority Data

| | | | |
|---|---|---|---|
| May 8, 1992 | [JP] | Japan | 4-115689 |
| May 8, 1992 | [JP] | Japan | 4-115692 |
| May 11, 1992 | [JP] | Japan | 4-30500[U] |
| May 15, 1992 | [JP] | Japan | 4-123116 |

[51] Int. Cl.$^5$ .............................................. H02K 7/08
[52] U.S. Cl. ........................................ 310/90; 310/42; 310/67 R; 310/156; 384/112; 384/123
[58] Field of Search ............... 310/90, 156, 67 R, 43, 310/91, 42; 384/112, 113, 123, 292, 425, 427, 428

[56] References Cited

U.S. PATENT DOCUMENTS

| | | | |
|---|---|---|---|
| 4,120,544 | 10/1978 | Huber | 384/292 |
| 4,658,312 | 4/1987 | Eleasser | 310/67 U X |
| 4,934,836 | 6/1990 | Tanaka | 384/113 |
| 5,103,335 | 4/1992 | Sugiura | 310/90 |
| 5,142,176 | 8/1992 | Takahashi | 310/67 R |
| 5,223,758 | 6/1993 | Kataoka | 310/90 |

FOREIGN PATENT DOCUMENTS

| | | | |
|---|---|---|---|
| 412509 | 2/1991 | European Pat. Off. | 384/112 |
| 2504204 | 8/1976 | Fed. Rep. of Germany | 384/112 |
| 2-80808 | 3/1990 | Japan | 384/112 |
| 140509 | 5/1992 | Japan | 384/113 |
| 175510 | 6/1992 | Japan | 384/112 |
| 122275 | 2/1971 | United Kingdom | 384/112 |

OTHER PUBLICATIONS

Webster's Encyclopedic Unabridged Dictionary, 1989, Gramercy Books, N.J. (3 pages).

*Primary Examiner*—R. Skudy
*Attorney, Agent, or Firm*—Lowe, Price, LeBlanc & Becker

[57] ABSTRACT

A motor having a dynamic-pressure type bearing device includes a cylindrical sleeve fixedly secured to a base, a shaft rotatably inserted into a hollow of the cylindrical sleeve, a hub fixedly secured to an end portion of the shaft, a ring-like rotor magnet fixedly secured to the hub, and an armature fixedly secured onto the base to be in opposed relation to the rotor magnet so as to constitute a motor driving device. Further, the motor has a disc-like plate coaxially and fixedly secured to an end portion of the shaft to have a diameter of the disc-like plate greater than a diameter of the shaft and a plate disposed in opposed relation to a surface of the disc-like plate. The bearing device includes a radial dynamic-pressure groove assembly having a predetermined groove configuration to generate a radial dynamic pressure in a radial direction of the shaft and an axial dynamic-pressure groove assembly having a predetermined groove configuration to generate an axial dynamic pressure in an axial direction of the shaft. The radial dynamic-pressure groove assembly is formed in at least one of an outer circumferential surface of the shaft and an inner surface of the cylindrical sleeve which face each other and the axial dynamic-pressure groove assembly is formed in at least one of the surface of the disc-like plate and a surface of the plate disposed in opposed relation to the surface of the disc-like plate.

34 Claims, 9 Drawing Sheets

MOTOR WITH DYNAMIC-PRESSURE TYPE BEARING DEVICE

BACKGROUND OF THE INVENTION

The present invention relates to a motor with a dynamic-pressure type bearing device, and is applicable particularly, but not exclusively, to a drive motor such as a spindle motor for use in a computer-related information processing apparatus such as a hard disc drive and a floppy disc drive which motor is required to have a high-speed rotation, a high rotational accuracy, a small vibration, a high rigidity and other operating characteristics.

Conventionally, a dynamic-pressure type bearing device is used as a bearing for a laser printer polygon mirror drive motor, VTR cylinder motor and the like, while a spindle motor with a dynamic-pressure type bearing device is not yet adopted for a hard disc drive, particularly below 3.5 inches, which is a computer-peripheral information storage unit of which a higher performance and a higher reliability are required. This is because the reliability such as a long lifetime of the dynamic-pressure type bearing device lacks concurrently with problems in structure, accuracy, cost and others. For example, difficulty is encountered to provide an appropriate axial-direction dynamic-pressure type bearing structure and while satisfying a requirement for rigidity against impact in the axial direction. Accordingly, the conventional spindle motor for the hard disc drive adopts a ball bearing. However, recently, in addition to requirements such as size-reduction, anti-impact, noise-reduction and long lifetime, in accordance with sharp increase in storage capacity and recording density the access speed is increased, thus requiring a high rotational accuracy and a high-speed operation. The conventional ball bearing cannot cope with these requirements.

SUMMARY OF THE INVENTION

It is therefore an object of the present invention to provide a spindle motor with a dynamic-pressure type bearing device which is capable of realizing a high-speed rotation, high rotational accuracy, small vibration, high rigidity and long lifetime.

A motor according to this invention comprises a cylindrical sleeve fixedly secured to a base, a shaft rotatably inserted into a hollow of the cylindrical sleeve, a hub fixedly secured to an end portion of the shaft, a ring-like rotor magnet fixedly secured to the hub, and an armature fixedly secured onto the base to be in opposed relation to the ring-like rotor magnet so as to construct motor drive means for driving said motor. Also included in the motor are a disc-like plate coaxially and fixedly secured to an end portion of the shaft so that a diameter of the disc-like plate is greater than a diameter of the shaft and plate means disposed in opposed relation to a surface of the disc-like plate. Further, in this motor there is provided dynamic-pressure type bearing means comprising radial dynamic-pressure groove means having a predetermined groove configuration to generate a radial dynamic pressure in a radial direction of the shaft and axial dynamic-pressure groove means having a predetermined groove configuration to generate an axial dynamic pressure in an axial direction of the shaft. The radial dynamic-pressure groove means is formed in at least one of an outer circumferential surface of the shaft and an inner surface of the cylindrical sleeve which are in opposed relation to each other and the axial dynamic-pressure groove means is formed in at least one of the surface of the disc-like plate and a surface of the plate means disposed in opposed relation to the surface of the disc-like plate. This arrangement can easily construct the axial dynamic-pressure type bearing and increase the rigidity of the motor in the axial direction.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
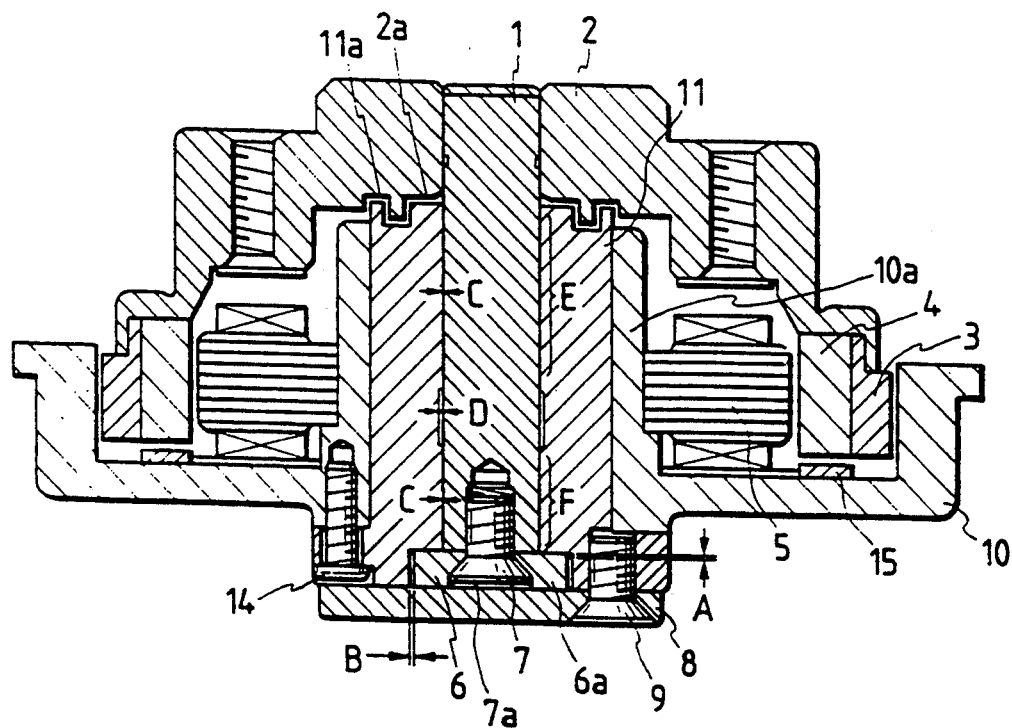
FIG. 1 is a cross-sectional view showing an arrangement of a rotating-shaft type disc-drive spindle motor with a dynamic-pressure type bearing device according to a first embodiment of this invention.

Referring now to FIG. 1, a description will be made hereinbelow in terms of a first embodiment of this invention. FIG. 1 is a cross-sectional view showing a disc drive spindle motor equipped with a shaft-rotatable and dynamic-pressure type bearing device. In FIG. 1, designated at numeral 1 is a shaft an upper portion (tip portion) of which is fixedly secured to a hub 2. A ring-like magnet 4 is fixedly adhered through a back yoke 3 to an inside portion of the hub 2, and an armature 5 is placed at the inside of the ring-like magnet 4 in opposed relation thereto and fixedly adhered to a cylindrical portion 10a of a base 10, which cylindrical portion is disposed around the shaft 1, whereby the magnet 4 and the armature 5 constitute a motor structure. Further, with a screw 7, to the other end of the shaft 1 there is fixedly connected one surface (upper surface) of a disc-like plate 6 (which will be referred hereinafter to as a thrust plate) which has a diameter greater than that of the shaft 1. The thrust plate 6 is rotatable together with the shaft 1. The thrust plate 6 has an axial-direction dynamic-pressure bearing function and also acts as a means for preventing the shaft 1 from failing when an abnormal force is axially applied to the shaft 1. Here, it is also appropriate to integrally construct both the shaft 1 and thrust plate 6.

Figure 3:
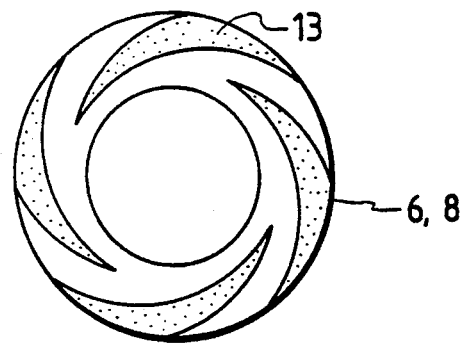
FIG. 3 shows first axial dynamic-pressure generating grooves to generate a dynamic pressure in a ring according to this invention.

As illustrated in FIG. 3, dynamic-pressure grooves 13 for generation of an axial dynamic pressure are formed in the lower surface 6a of the thrust plate 6 (shown in FIG. 1) and further in at least one of the upper and lower surfaces of a plate 8 disposed in opposed relation to the thrust plate 6. The plate 8 is fixed through a screw 9 to a sleeve 11 (cylindrical member) disposed between the shaft 1 and the cylindrical portion 10a of the base 10. The sleeve 11 is inserted into the cylindrical portion 10a of the base 10 and fixed thereto through a screw 14. Although in this embodiment the base 10 and the sleeve 11 are made of different materials and hence fixed to each other through the screw 14, if both are made of the same material, it is possible to construct the sleeve 11 as a portion of the base 10.

Figure 5:
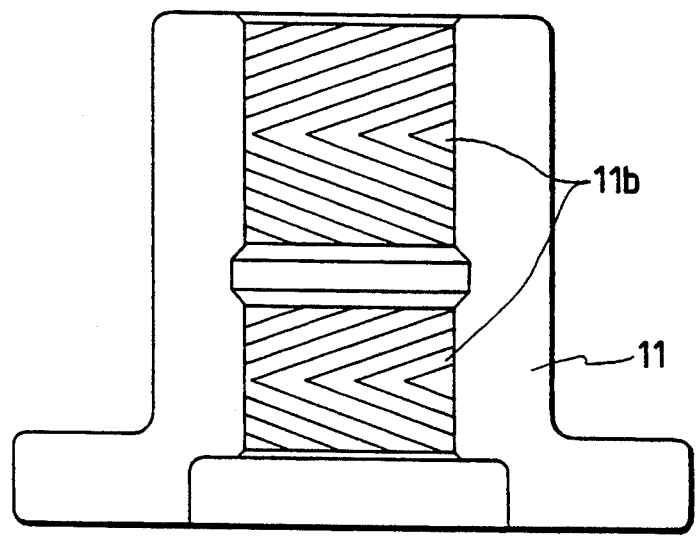
FIG. 5 is a cross-sectional view showing a sleeve having at its inner circumferential surface radial dynamic-pressure grooves having a ring-bone configuration.

The sleeve has at its center portion a through-hole into which the shaft 1 is inserted and has portions E and F which act as radial dynamic-pressure bearing portions and which are arranged to form gaps C of 2 to 10 microns with respect to the shaft 1. Further, the other portion of the sleeve 11 between the radial dynamic-pressure bearing portions E and F is arranged to form a gap D, greater than the gap C, with respect thereto. As shown in FIG. 5, the radial dynamic-pressure bearing portions E and F have at their inner surfaces dynamic-pressure grooves 11b having a ring bone configuration. Here, it is also appropriate that such dynamic-pressure grooves are formed in the outer surface of the shaft 1 in place of the radial dynamic-pressure bearing portions E and F or additionally formed in the outer surface of the shaft 1.

Returning again to FIG. 1, in an upper end surface portion 11a of the sleeve 11 there is formed a concave portion which is engaged with a convex portion formed on the confronting surface 2a of the hub 2 so as to construct a labyrinth type seal. At these portions there is applied an oil-repellent material containing fluorine component, whereby it is possible to prevent leakage of lubricating oil and leakage of generated gas.

Figure 8:
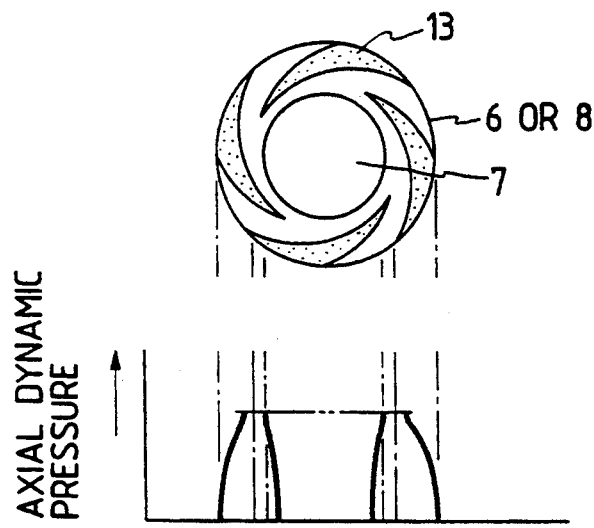
FIG. 8 is an illustration for describing a first axial dynamic pressure due to the first axial dynamic-pressure grooves in this invention.

In this embodiment, the thrust plate 6 has the screw 7 at its center portion so that the portion brought into contact with the plate 8 has a ring-like configuration. As illustrated in FIG. 8, the axial dynamic-pressure grooves 13 (first axial dynamic-pressure bearing portion) are formed so that the dynamic pressure is generated on a coaxial circle (in a ring) whose diameter is greater than that of the shaft 1. This is for preventing the inclination of the shaft 1 due to the radial dynamic pressure and the axial dynamic pressure occurring in a ring and away front the center of the shaft 1 when a stress is applied thereto by vibrations in the radial directions and further for providing a structure strong in the radial vibration rigidity. Particularly, this arrangement is effective in the case that the lengths of the radial dynamic-pressure bearing portions E and F in the axial directions are-short.

Further, in this embodiment a space (concave portion) 7a is formed below the screw 7 by the thrust plate 6, the plate 8 and the screw 7. This space 7a is filled with a lubricating oil so as to prevent the oil from running out to allow a long time operation.

Figure 4A:
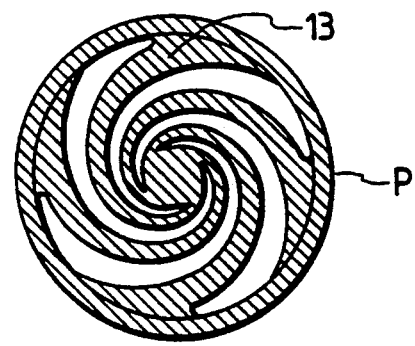
FIG. 4A shows spiral grooves which can acts as the first axial dynamic-pressure grooves in this invention.
Figure 4B:
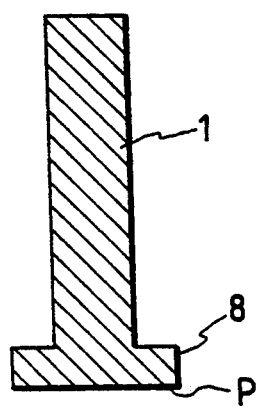
FIG. 4B is a cross-sectional view showing a shaft and disc-like plate in which the first axial dynamic-pressure grooves are formed.

In the case that the lengths of the radial dynamic-pressure bearing portions E and F can sufficiently be ensured and the loss (deterioration) of the bearing performance due to the axial dynamic-pressure bearing portion is desired to be reduced, it is also appropriate that as illustrated in FIG. 4A an axial dynamic-pressure bearing is constructed by simply-shaped spiral grooves 13 so that the center of the dynamic pressure is coincident with the center of the shaft 1 (the center of rotation). This substantially corresponds to a pivot bearing whereby it is possible to reduce the loss of the bearing performance (which will be referred to as a bearing loss). FIG. 4B is a cross-sectional view showing an integral arrangement of the shaft 1 and plate 8, opposing the thrust plate 6 in this case. Here, an oil-pool (concave portion) P is formed at the vicinity of the circumference of the thrust plate 6 and at the first axial dynamic-pressure generating side, thereby allowing a long time operation.

Further, returning again to FIG. 1, the thrust plate 6 is encased in a cylindrical hole formed at a lower portion of the sleeve 11. The diameter of the cylindrical portion is determined to form a gap B between the inner circumferential surface of the cylindrical hole and the circumferential surface of the thrust plate 6. At this time, the thickness of the thrust-plate 6 is determined so as to satisfy a condition of the thickness of the thrust plate $6 >$ the gap $B \times 20$. Further, the depth of the cylindrical hole is determined to gap A (for example, 10 to 50 microns) with respect to the upper surface of the thrust plate 6.

Figure 6:
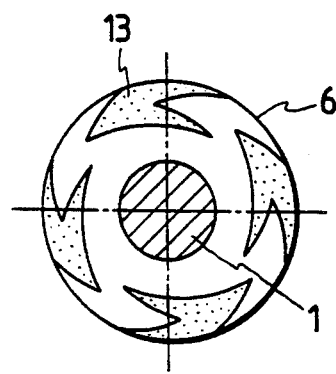
FIG. 6 shows second axial dynamic-pressure grooves in this invention.

The aforementioned inequality is determined so that a damping effect is shown by the oil provided in the gap A even if vibrations occurs in the axial directions or impact loads are applied in the axial directions. This effect becomes greater as the gap B is smaller. Particularly, in the case of requiring the anti-vibration and anti-impact performances in the axial directions, axial dynamic-pressure grooves 13 (a second axial dynamic-pressure bearing portion) as illustrated in FIG. 6 are formed in the upper surface of the thrust plate 6 confronting the gap A or a surface (the bottom surface) of the cylindrical hole which faces the upper surface of the thrust plate 6 (the gap A).

With this arrangement, the thrust plate 6 can more strongly be held by the first and second axial dynamic bearing portions and the anti-vibration and anti-impact performances in the axial directions can more be improved by the damping effect due to the gap B and the lubricating oil.

Secondly, a description will be made hereinbelow in terms of a method of giving a back pressure. Conventionally, the back pressure standing against the axial dynamic pressure is given by the dead load of the rotating portion or a spring additionally provided. However, in the case of giving the back pressure by the dead load, there is a limit in the back pressure load to be given, and hence the degree of freedom becomes small, and in the case of giving the back pressure by the spring, the spring is forced to be disposed at the outside of the rotating portion and therefore a space therefor is required which makes difficult the size-reduction of the motor. On the other hand, in this embodiment, the magnetic suction force of the rotor magnet 4 is used as the back pressure against the dynamic pressure in the case of providing only the first axial dynamic-pressure bearing portion or an auxiliary pressure for the dynamic pressure to be generated by the second axial dynamic-pressure bearing portion.

Figure 7A:
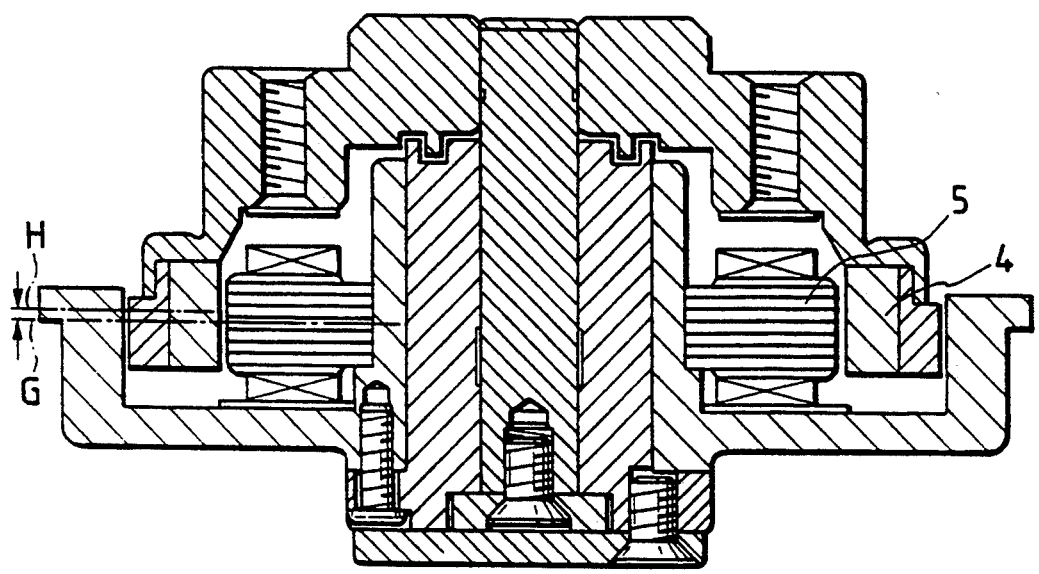
FIGS. 7A and 7B are cross-sectional views for describing use of a magnetic suction force of a rotor magnet as a back pressure against a dynamic pressure generated.
Figure 7B:
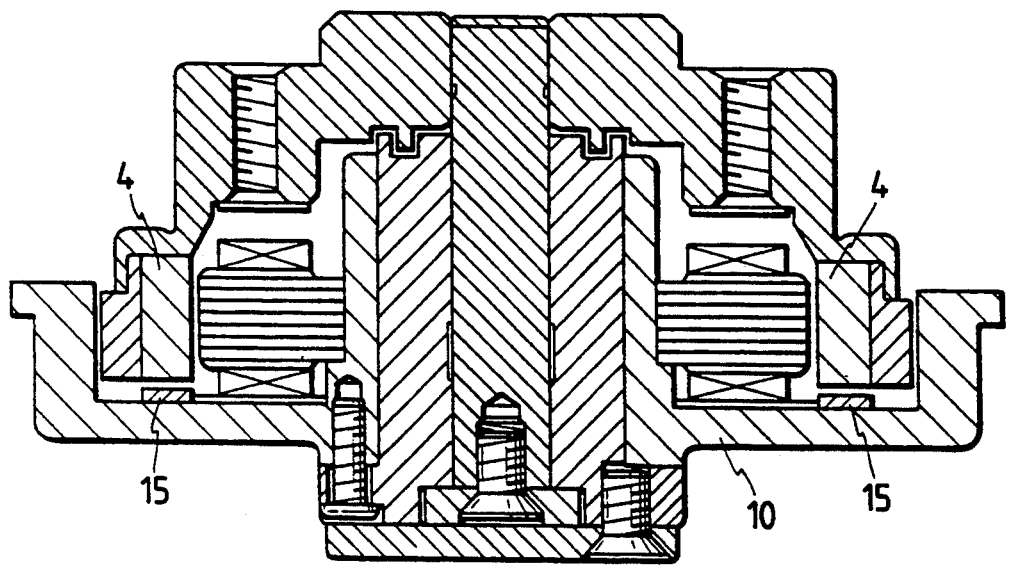

In FIG. 1, in response to energizing the armature 5, the shaft 1 and all the portions fixedly connected thereto start to rotate as a motor. Further, a dynamic pressure is generated at the first axial dynamic-pressure bearing portion so that the thrust plate 6 starts to float and rotate. At this time, the floating height of the thrust plate 6 becomes unstable. That is, the floating height varies due to a slight external stress. Accordingly, for increasing the rigidity thereof, the back pressure is required as a force to repel the dynamic pressure. Similarly, in the case of providing the second axial dynamic-pressure bearing portion, when the second axial dynamic pressure is not sufficiently ensured because of difficulty to take a sufficient space, the first and second axial dynamic pressures become balanced with a low rigidity so that the floating height varies due to a slight external stress, thereby requiring the auxiliary pressure for the second axial dynamic pressure. Thus, in this invention, the magnetic suction force of the rotor magnet 4 is used as the back pressure or the auxiliary pressure. FIGS. 7A and 7B are illustrations for describing the use of the magnetic suction force of the rotor magnet 4. In FIG. 7A the magnetic center H of the rotor magnet 4 is arranged to be shifted from the magnetic center G of the armature 5 so as to always provide a downward suction force (back pressure) to the rotor magnet 4, and in FIG. 7B a suction plate 15 made of a magnetic material is provided on a surface of the base 10 to be in opposed relation to the rotor magnet 4 so as to provide a downward suction force (back pressure) to the rotor magnet 4. These arrangements can freely adjust the back pressure and prevent enlargement of the apparatus because of not requiring a particular spring or the like.

A further feature of the dynamic-pressure bearing device in this invention is that the above-mentioned cylindrical portion (sleeve 11) is made of a material having a thermal expansion coefficient smaller than that of the shaft 1. This is based upon the fact that the bearing loss and the bearing rigidity increase when the gap C between the sleeve 11 and the shaft 1 is made small and they decrease when the gap C therebetween is made large. That is, the variations of the bearing rigidity and the bearing loss due to variation of the viscosity due to the temperature variation of a liquid can be cancelled by the variation of the gap C caused by the difference in thermal expansion coefficient between the sleeve 11 and the shaft 1. Thus, the difference in thermal expansion coefficient between the sleeve 11 and the shaft 1 can remove the drift due to temperature.

Figure 9A:
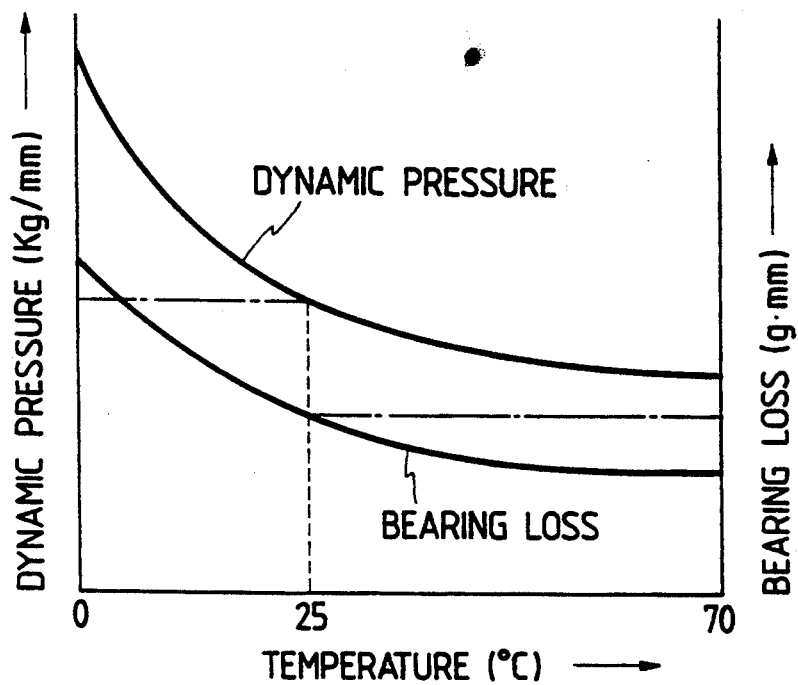
FIG. 9A is a graphic illustration for describing a radial dynamic pressure and a bearing performance loss with respect to variation of temperature in a conventional dynamic-pressure bearing device.
Figure 9B:
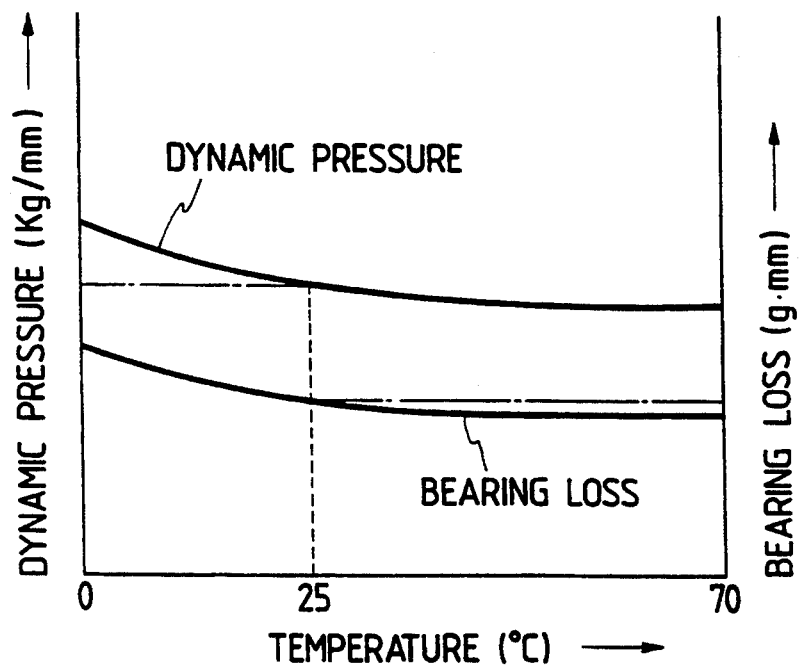
FIG. 9B is a graphic illustration for describing a radial dynamic pressure and a bearing performance loss with respect to variation of temperature in a dynamic-pressure bearing device according to this invention.

That is, in this invention, with the sleeve 11 being made of a material having a thermal expansion coefficient smaller than that of the shaft 1 (the thermal expansion coefficient of the sleeve 11 < the thermal expansion coefficient of the shaft 1) and the diameter of the shaft 1 and the inner diameter of the sleeve 11 being determined so that the gap C between the shaft 1 and the sleeve 11 varies by a value corresponding to the variations of the bearing loss and bearing rigidity due to the temperature variation of the liquid, the variations of the bearing rigidity and demand of the motor due to the variation of temperature are prevented. For example, the sleeve 11 is made of brass (the thermal expansion coefficient: $18 \times 10^{-6}/°C$.) and the shaft 1 is made of aluminum (the thermal expansion coefficient: $24 \times 10^{-6}/°C$.), whereby the radial bearing gap becomes greater at a low temperature as compared with the radial bearing gap set at the ordinary temperature so as to cancel the increase in the dynamic pressure (bearing rigidity) and bearing loss due to the increase in viscosity of the oil. Moreover, since the bearing gap becomes smaller at a high temperature, it is possible to cancel the decrease in the dynamic pressure (bearing rigidity) and bearing loss due to the decrease in viscosity of the oil. Accordingly, it is possible to stabilize the dynamic pressure (bearing rigidity) in a temperature range for use of the motor and further stabilize the bearing loss. FIG. 9A is a graphic illustration of variations of the dynamic pressure (bearing rigidity) and bearing loss with respect to variation of temperature in a conventional case that the sleeve is made of a brass (the thermal expansion coefficient: $19.9 \times 10^{-6}/°C$.) and the shaft is made of SUS material (the thermal expansion coefficient: $13 \times 10^{-6}/°C$.), and FIG. 9B is a graphic illustration of variations of the dynamic pressure (bearing rigidity) and bearing loss with respect to variation of temperature in this embodiment, wherein the sleeve 11 is made of a brass (the thermal expansion coefficient: $18 \times 10^{-6}/°C$.) and the shaft 1 is made of aluminium (the thermal expansion coefficient: $24 \times 10^{-6}/°C$.). Here, although in this embodiment all portions of the shaft I are made of aluminium, it is appropriate that the shaft 1 is made of a material such as a SUS material having a great rigidity and coated with a material such as polyacetal resin having a great thermal expansion coefficient ($80 \times 10^{-6}/°C$).

Figure 10:
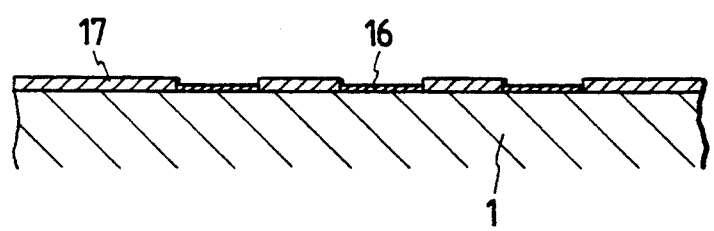
FIG. 10 is a cross-sectional view showing a method of forming dynamic-pressure grooves by deposition in accordance with the invention.

A description will be made hereinbelow in terms of methods of forming the dynamic-pressure grooves (comprising convex and concave portions). First, a method of forming the dynamic-pressure grooves in accordance with a deposition technique will be described with reference to FIG. 10. FIG. 10 shows a new groove forming method. In FIG. 10, first the shaft 1 to be processed to have the dynamic-pressure grooves in its surface is completed to have a predetermined diameter corresponding to the diameter of the concave portions of the dynamic-pressure grooves. Secondly, a masking 16 is made at portions corresponding to the concave portions of the grooves in accordance with the photoresist method, screen printing method or the like, and the shaft 1 is then put in a deposition kiln to deposit a strong structural material 17 having an abrasion resistance in accordance with the chemical deposition method, electron beam deposition method or the like so as to form the convex portions of the grooves. Thereafter, the masking 16 is removed in accordance with a well-known technique, thereby forming the dynamic-pressure grooves. According to this groove forming method, the dimension of the dynamic grooves is controllable in units of submicron to easily provide a high-accuracy bearing device. In addition, it is possible to lengthen the lifetime of the bearing device with a great abrasion resistance material being coated on the sliding surfaces in accordance with a deposition method.

Figure 11:
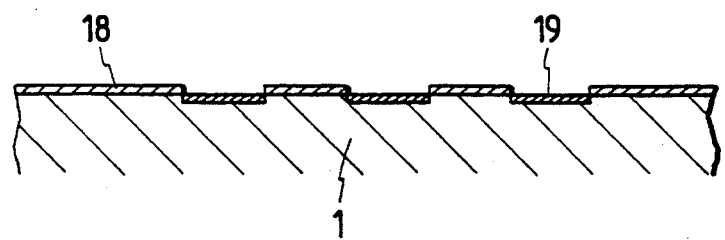
FIG. 11 is a cross-sectional view showing a method of forming dynamic-pressure grooves by etching in this invention.

Further, a method of forming the dynamic-pressure grooves in accordance with the etching technique will be described hereinbelow. As illustrated in FIG. 11, a masking 18 is made at portions other than portions corresponding to the concave portions of the dynamic-pressure grooves in accordance with the photoresist technique, screen printing technique or the like, and the shaft 1 is then put in an etching vessel to etch the portions 19 other than the masking portions 18, thereafter removing the masking 18.

Figure 12:
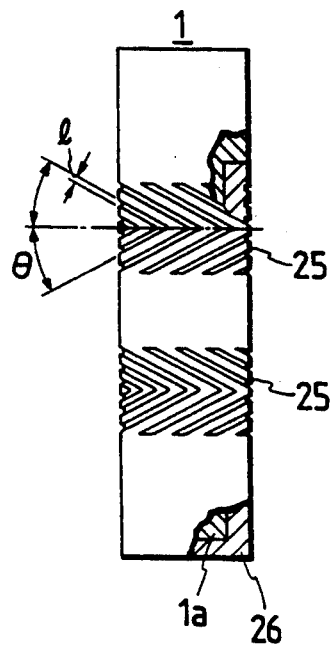
FIG. 12 is a partial cross-sectional view showing a shaft having on its surface dynamic-pressure grooves formed by resin molding in this invention.
Figure 13:
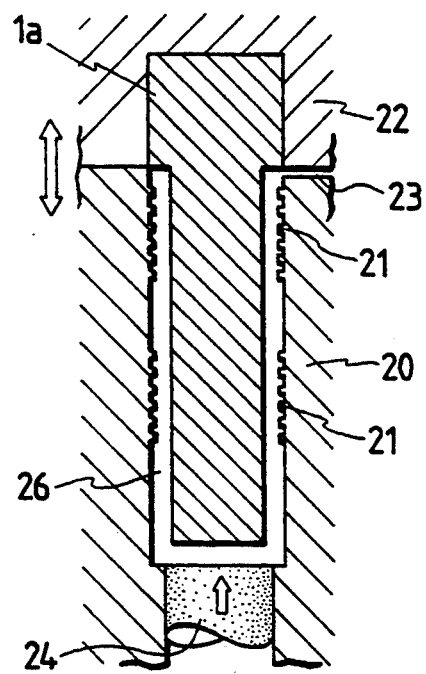
FIG. 13 is a cross-sectional view showing a metal pattern for forming the dynamic-pressure grooves on a surface of a shaft by resin molding.

Moreover, a method of forming the dynamic-pressure grooves by a resin molding technique will be described herein below with reference to FIGS. 12 and 13. FIG. 12 shows an appearance of the shaft 1 in which the dynamic-pressure grooves are formed by the resin molding method, and FIG. 13 is a partial cross-sectional view showing a metal pattern for forming the shaft 1. In FIG. 12, numeral 25 designates the radial dynamic-pressure grooves, 26 represents a resin-molded layer (a space for molding the resin), and 1a denotes a central portion of the shaft 1, and in FIG. 13, numeral 20 represents a cavity forming portion, 21 designates ring-bone-shaped ribs formed at the inner surface of the cavity forming portion 20 to be in opposed relation to the central portion 1a of the shaft 1 so as to form the dynamic-pressure grooves, and 22 denotes a core.

In the state as shown in FIG. 13, a resin such as polyacetal resin is injected from a gate portion 23 into the cavity forming portion 20 (the resin molded layer 26). At this time, the injected-resin temperature is set to about 200° C. and the temperature of the metal pattern is set to be in a range between 60° to 80° C. After the resin injection and molding, the cavity forming portion 20 and the core 22 are opened so that the central portion 1a stands at the cavity forming portion 20 side with it being coated with the resin. After cooling, the central portion 1a is pressed by an ejection pin 24 in a direction indicated by an arrow, thereby completing the shaft 1 having the radial dynamic-pressure grooves 25 of FIG. 12 after removing the resin at the gate portion 23 in accordance with a well known method.

Here, the shaft 1 can easily be separated from the cavity forming portion 20 by the ejection pin 24 irrespective of having the dynamic grooves (under cut). That is, this is because the difference in contraction between the metal pattern and the polyacetal resin occurs by about 20/1000 due to the difference in thermal expansion coefficient therebetween and the difference between the temperature before the resin molding and the temperature after the resin molding. For example, when the thickness of the resin-molded layer 26 is taken to be 0.5 mm, the outer dimension of the resin-molded layer 26 is reduced by $20/1000 \times 0.5$ mm=0.01 min. On the other hand, the depth of the grooves 25 is as shallow as 0.003 to 0.006 min. Thus, the shaft 1 can smoothly be separated from the metal pattern. If satisfying a condition of the depth of the grooves < the contraction difference × resin thickness, a smooth resin molding can be effected irrespective of the kind of the resin. Preferably, as the resin there is used a resin which satisfies the aforementioned condition, accurately copies the metal pattern and has a great abrasion resistance.

Figure 14:
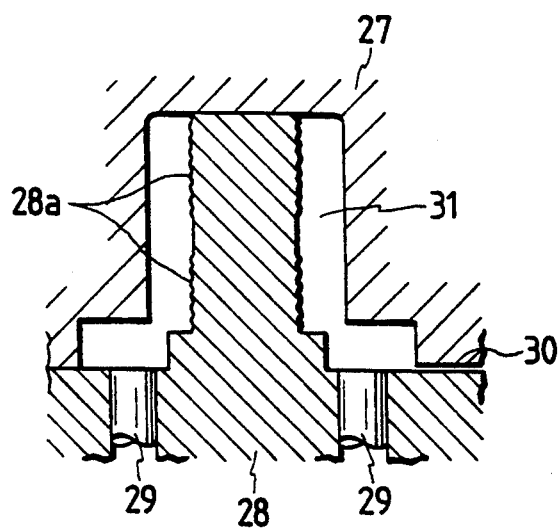
FIG. 14 is a cross-sectional view showing a metal pattern for forming dynamic-pressure grooves on an inner circumferential surface of a sleeve by resin molding.
Figure 15:
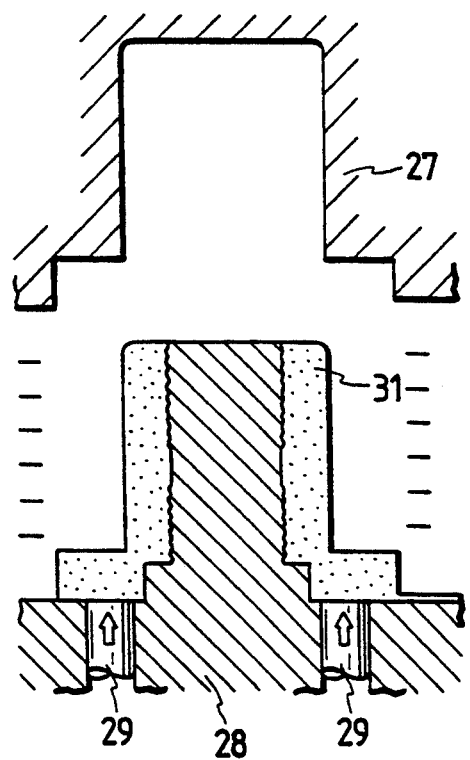
FIG. 15 is a cross-sectional view showing an opened state of the FIG. 14 metal pattern.

FIGS. 14 and 15 are illustrations for describing a method of manufacturing radial dynamic -pressure generating grooves in the inner surface of the sleeve 11 of FIG. 1. For forming at the inner circumferential portion of the sleeve 11 dynamic-pressure grooves similar to the grooves as shown in FIG. 12, a formation metal pattern is used which has a cross section as shown in FIG. 14. In FIG. 14, numeral 27 is a core, 28 represents a die portion for forming a cavity (a portion corresponding to the hollow of the sleeve 11) having at its circumference predetermined ring-bone-shaped ribs 28a, and 29 designates ejection pins. With the metal pattern being closed as shown in FIG. 14, a resin is injected from a gate portion 30 into a gap forming portion (outer cylindrical portion) 31 between the cavity forming die portion 28 and the core 27. Thereafter, the metal pattern is opened whereby the resin-molded portion 31 is released together with the cavity forming die portion 28. In this state, the resin-molded portion 31 is heated by a heater to be expanded and then pushed by the ejection pins 29 in directions indicated by arrows, thereby completing the sleeve 11 having the radial dynamic-pressure generating grooves at its inner circumferential portion.

Figure 16:
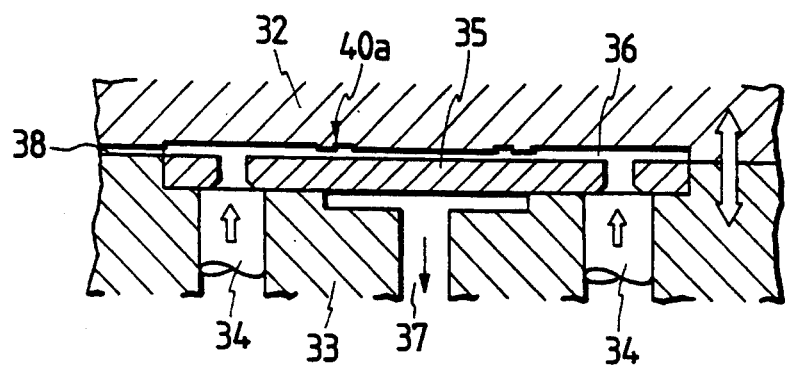
FIG. 16 is a cross-sectional view showing a metal pattern for forming dynamic-pressure grooves on a disc-like plate or a plate.
Figure 17:
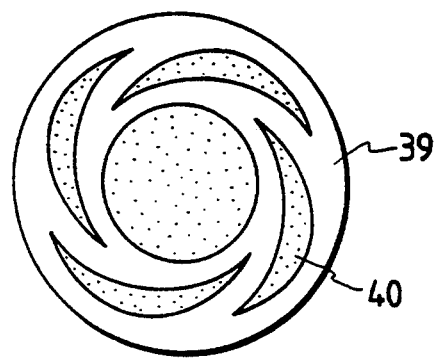
FIG. 17 is an illustration of axial dynamic-pressure grooves formed on a disc-like plate or a plate in this invention.

FIG. 16 is a cross-sectional view showing a metal pattern for forming axial dynamic-pressure grooves (40) (FIG,. 17) on an axial dynamic-pressure bearing portion (39) as illustrated in FIG. 17. In FIG. 16, numeral 32 is a cavity forming portion of the metal pattern, 33 designates a core, 34 represents ejection pins, 35 denotes a metal plate corresponding to the center portion of the axial dynamic-pressure bearing portion, 36 depicts a resin-injected portion, and 37 is an air suction hole for sucking and holding the metal plate 35. In the case that the metal plate 35 is made of a magnetic material, a suction magnet can be disposed at the same position in place of the air suction hole 37, and in the case that the metal pattern is of a vertical type, the air suction hole 37 can be omitted because the metal plate can be held by the dead load. The metal plate 35 is not necessarily used and, in this case, the resin is put in that place and the air suction hole 37 is not required. Also formed in the metal pattern are ribs 40a for forming the axial dynamic-pressure grooves 40 as illustrated in FIG. 17.

First, the metal pattern is opened to set the metal plate 35 which is in turn held by air suction. Secondly, in the state as shown in FIG. 16 the resin is injected from a gate portion 38 into the resin-injected portion 36. Thereafter, the metal pattern is again opened so that the molded-resin is pushed by the ejection pins 34 simultaneously with stopping the air suction operation, thereby completing the axial dynamic-pressure bearing portion 39.

Figure 18:
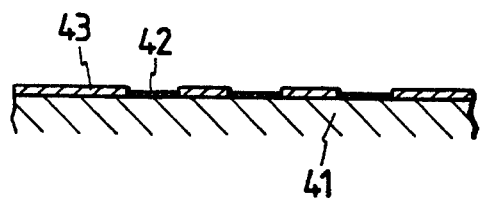
FIG. 18 is a cross-sectional view showing a method of forming ribs corresponding to dynamic-pressure grooves on a metal pattern.

FIG. 18 is an illustration for describing a new method of forming the above-mentioned ribs 21, 28a and 40a. In FIG. 18, first, a core 41 to be processed to have the dynamic-pressure grooves is finished to a predetermined dimension by a well-known mechanical machining method. This processing can easily and accurately be effected because of not having the dynamic-pressure grooves. Secondly, a masking is made with respect to portions 42 corresponding to the concave portions of the grooves in accordance with the photoresist method, a screen printing method or the like, and the core 41 is put in a deposition vessel so as to deposit a strong structural material 43 in accordance with a deposition method such as a chemical deposition method and an electron beam deposition method. Finally, the masking portions 42 are removed. According to this rib forming method, the ribs can be formed in units of submicron to accurately from the grooves. In addition, the surface roughness can be kept to the roughness of the deposited material. This method is also applicable to a pressurizing formation type metal pattern. Further, since the dynamic-pressure grooves are formed by the resin, it is possible to simply form the dynamic-pressure grooves at a low cost and to provide a dynamic-pressure bearing device with a high accuracy.

Figure 19A:
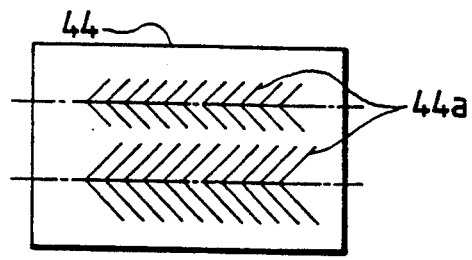
FIG. 19A shows a rolling plate for forming dynamic-pressure grooves on a shaft.
Figure 19B:
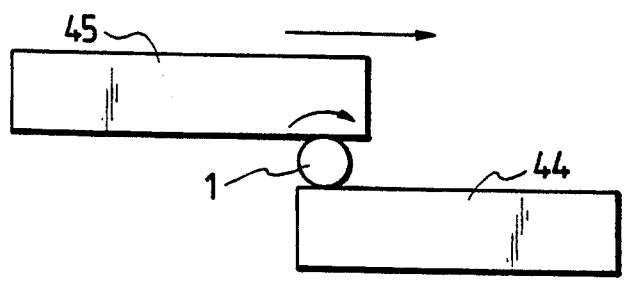
FIG. 19B is a cross-sectional view showing a method of forming dynamic-pressure grooves on a shaft by rolling.

Still further, a method of forming the dynamic-pressure grooves in accordance with the rolling technique will be described hereinbelow. FIGS. 19A and 19B show the case of forming the dynamic-pressure grooves on the shaft 1. In FIG. 19A and 19B, designated at numeral 44 is first rolling plate having on its a surface projection ribs 44a corresponding to the dynamic-pressure grooves. Numeral 45 is a second rolling plate having a flat and smooth surface. The shaft 1 is set between the first and second rolling plates 44 and 45 and the second (upper side) rolling plate 45 is fed in an direction indicated by a arrow so that the shaft 1 rotates whereby the dynamic-pressure grooves are formed in the surface of the shaft 1.

Figure 20:
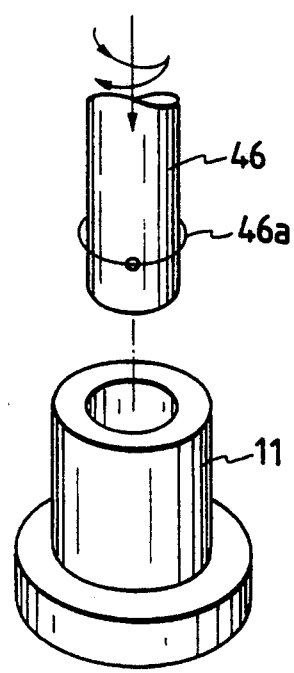
FIG. 20 is an illustration for describing a method of forming dynamic-pressure grooves in an inner circumferential surface of a sleeve.

FIG. 20 shows a method of forming the dynamic-pressure grooves at the inner circumferential portion of the sleeve 11. In FIG. 20, designated at numeral 46 is a shaft which has a diameter slightly smaller than the inner diameter of the sleeve 11 and which has on its surface projections 46a. This shaft 46 acts as a rolling jig. The shaft 40 is rotated in the left and right directions with it being inserted into the hollow of the sleeve 11, thereby forming the dynamic-pressure grooves.- Here, the diameter of the projection portions 46a is determined to correspond to the depth of the grooves, and the insertion and rotation timings are determined on the basis of the angles of the grooves.

Figure 2:
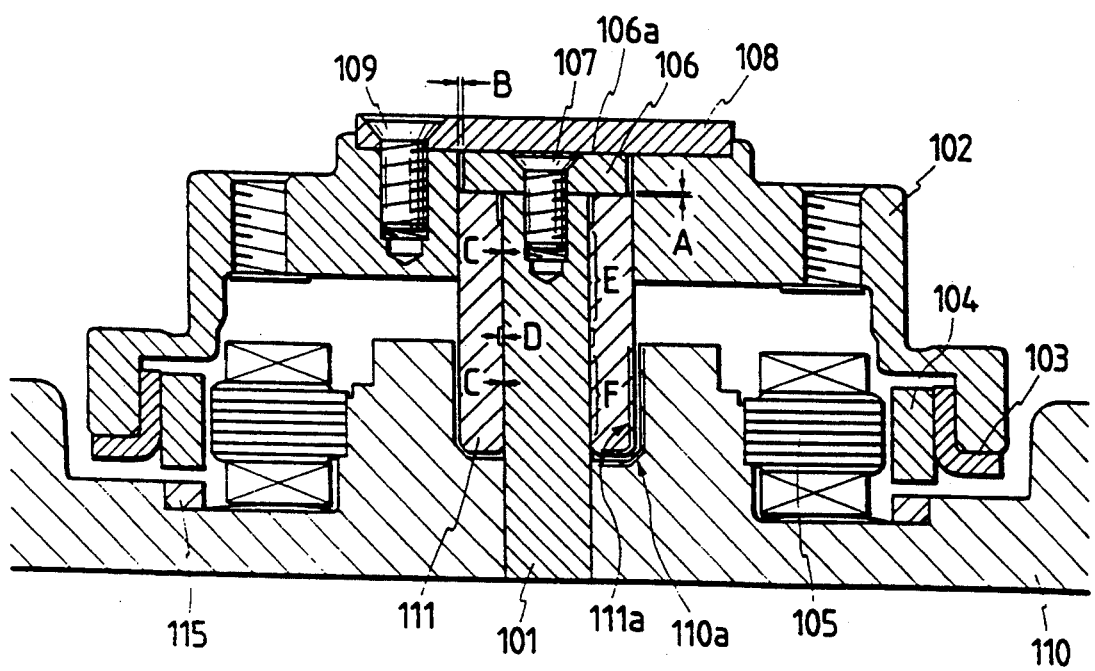
FIG. 2 is a cross-sectional view showing an arrangement of a fixed-shaft type disc-drive spindle motor with a dynamic-pressure type bearing device according to a second embodiment of this invention.

Further, a description will be made hereinbelow with reference to FIG. 2 in terms of a motor according to a second embodiment of this invention. Although in the above-described first embodiment the motor is of the shaft rotating type, this second embodiment relates to a disc drive spindle motor equipped with a fixed-shaft type dynamic-pressure bearing device. In FIG. 2, denoted at numeral 101 is a shaft whose lower end portion is inserted into a base 110 under pressure, and designated at numeral 111 is a sleeve into which the shaft 101 is rotatably inserted and which is fixedly secured to a cup-like hub 102. A ring-like magnet 104 is adhesively fixed through a back yoke 103 to the inside of the hub 102. Further, an armature 105 is disposed at the inside of the ring-like magnet 104 and at an opposed position thereto and adhesively fixed to a cylindrical portion of the base 110 so as to construct a motor structure. Still further, a disc-like plate (which will be referred hereinafter to as a thrust plate) 106 is integrally fixed through a screw 107 to the other end (upper end) of the shaft 101, the thrust plate 106 having a diameter greater than that of the shaft 101. This thrust plate 106 acts as an axial dynamic-pressure bearing portion concurrently with preventing the falling-out when an abnormal force is applied to the hub 102 in the axial direction. Here, it is appropriate that the shaft 101 is integrally constructed with the thrust plate 106. The axial dynamic-pressure generation grooves 13 as illustrated in FIG. 3 is formed as the first axial dynamic-pressure bearing portion on an upper surface 106a of the thrust plate 106 (shown in FIG. 2) and/or on the lower surface of a plate 108 disposed in opposed relation to the upper surface 106a of the thrust plate 106. The plate 108 is fixed through a screw 109 to the hub 102. In this embodiment, although the hub 102 and the sleeve 111 are constructed with different materials, they can be constructed with the same material. In other words, the sleeve 111 can be constructed as a portion of the hub 102.

The sleeve 111 has at its center portion a through-hole into which the shaft 101 is inserted, and the radial dynamic-pressure bearing portions E and F of the sleeve 111 are separated from the shaft 1 to form a gap C of 2 to 10 microns. Between the portions E and F there is formed a portion which is separated from the shaft 1 to form a gap D greater than the gap C, the gap D acting as an oil pool. In the radial dynamic-pressure bearing portions E and F there are formed ring-bone-shaped dynamic-pressure grooves as previously illustrated in FIG. 5 for the embodiment of FIG. 1. Although FIG. 5 shows the dynamic-pressure grooves as being formed in an inner surface of a sleeve, such as sleeve 111 of FIG. 2, it is also appropriate that the dynamic-pressure grooves are formed in the surface of the shaft 101 or formed in the inner surface of the sleeve 111 and the surface of the shaft 101.

A lower portion of the sleeve 111 or a circumferential portion 111a close thereto is engaged with the inner surface 110a of a cylindrical portion of the base 110 so as to constitute a labyrinth type seal. At these portions there is applied an oil-repellent material containing fluorine component, whereby it is possible to prevent leakage of lubricating oil and leakage of generated gas.

The thrust plate 106 is encased in a cylindrical hole formed at the upper portion of the sleeve 111 so that a gap B is formed between the circumferential surface of the thrust plate 106 and the inner circumferential surface of the cylindrical hole. Similarly, to the embodiment of FIG. 1, the thickness of the thrust plate 106 is determined so as to satisfy a condition of the thickness of the thrust plate $106 > $ the gap $B \times 20$. Further, the depth of the cylindrical hole is determined so as to form a gap A (10 to 50 microns) with respect to the lower surface of the thrust plate 106.

The other portions are similar to those of the above-described first embodiment. The radial and axial dynamic-pressure bearing portions are filled with the same lubricating oil, and the motor rotates in response to energization of the armature 105.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A motor comprising:
   a base;
   a cylindrical member fixedly secured to said base;
   a shaft rotatably inserted into a hollow of said cylindrical member;
   a hub fixedly secured to an upper end portion of said shaft;
   a ring-like rotor magnet fixedly secured to said hub;
   an armature fixedly secured onto said base to be in opposed relation to said ring-like rotor magnet so as to construct motor drive means for driving said motor;
   a disc-like plate coaxially and fixedly secured to a lower end portion of said shaft, a diameter of said disc-like plate being greater than a diameter of said shaft,
   plate means disposed in opposed relation to a lower surface of said disc-like plate; and
   dynamic-pressure type bearing means comprising radial dynamic-pressure groove means having a predetermined groove configuration to generate a radial dynamic pressure in a radial direction of said shaft and axial dynamic-pressure groove means having a predetermined groove configuration to generate an axial dynamic pressure in an axial direction of said shaft, said radial dynamic pressure groove means being formed in at least one of an outer circumferential surface of said shaft and an inner surface of said cylindrical member which are in opposed relation to each other and said axial dynamic-pressure groove means being formed in at least one of said lower surface of said disc-like plate and a surface of said plate means disposed in opposed relation to said lower surface of said disc-like plate,
   wherein said disc-like plate is encased in a cylindrical hole formed at a lower portion of said cylindrical member and a diameter of said cylindrical hole is determined so that a gap is formed between an inner circumferential surface of said cylindrical hole and an outer circumferential surface of said disc-like plate which are in opposed relation to each other, a thickness of said disc-like plate being determined so as to satisfy a condition of the thickness of said disc-like plate $>$ said gap $\times 20$.

2. A motor as claimed in claim 1, wherein said bearing means further comprises second axial dynamic-pressure groove means having a predetermined configuration to generate an axial dynamic pressure, said second axial dynamic-pressure groove means being formed in at least one of an upper surface of said disc-like plate and an end surface of said cylindrical hole which are in opposed relation to each other.

3. A motor as claimed in claim 1, wherein said rotor magnet is arranged such that its magnetic suction force is used as a back pressure opposite to the dynamic pressure in the axial direction.

4. A motor as claimed in claim 3, wherein said rotor magnet is disposed such that its magnetic center is shifted from a magnetic center of said armature in axial directions of said shaft to generate the back pressure against the axial dynamic pressure.

5. A motor as claimed in claim 3, further comprising a magnetic member disposed at a vicinity of said rotor magnet whereby the magnetic suction force of said rotor magnet with respect to said magnetic member acts as the back pressure against the axial dynamic pressure.

6. A motor as claimed in claim 1, wherein said axial dynamic-pressure groove means is arranged so that the axial dynamic pressure is generated in a ring.

7. A motor as claimed in claim 1, wherein said axial dynamic-pressure groove means has a concave portion to keep an oil.

8. A motor as claimed in claim 1, wherein said axial dynamic-pressure groove means is arranged so that a center of the axial dynamic pressure generated is coincident with an axis of said shaft.

9. A motor as claimed in claim 1, wherein a portion or all portions of said shaft is made of a material greater in thermal expansion coefficient than that of said cylindrical member.

10. A motor as claimed in claim 1, wherein a portion or all portions of sliding surfaces of said bearing means are coated with a material having an abrasion resistance.

11. A motor as claimed in claim 1, wherein concave and convex portions of said groove means are formed by deposition of a structural material.

12. A motor as claimed in claim 1, wherein concave and concave portions of said groove means are formed by etching.

13. A motor as claimed in claim 1, wherein concave and convex portions of said groove means are formed by molding of a resin.

14. A motor as claimed in claim 1, wherein concave and convex portion of said radial dynamic-pressure groove means are formed by transferring a predetermined pattern to a surface of said shaft with said shaft being rolled by a device having said predetermined pattern on its surface.

15. A motor as claimed in claim 1, wherein an oil-repellent material is applied around said radial dynamic-pressure groove means and said axial dynamic-pressure groove means so as to prevent leakage of lubricating oil comprising a fluorine component provided in said groove means.

16. A motor as claimed in claim 1, wherein lubricating oils for said radial dynamic-pressure groove means and said axial dynamic-pressure groove means are made of the same material.

17. A motor as claimed in claim 1, wherein a portion of said hub and a portion of said cylindrical member are constructed to be engaged with each other so as to form a labyrinth type seal.

18. A motor comprising:
    a base;
    a shaft fixedly secured to said base;
    a hub having at its center portion a cylindrical member, said shaft being inserted into a hollow of said cylindrical member so that said hub is rotatable;
    a ring-like rotor magnet fixedly secured to said hub;
    an armature fixedly secured onto said base to be in opposed relation to said ring-like rotor magnet so as to construct motor drive means for driving said motor;

a disc-like plate coaxially and fixedly secured to an upper end portion of said shaft, a diameter of said disc-like plate being greater than a diameter of said shaft;

plate means disposed in opposed relation to an upper surface of said disc-like plate; and dynamic-pressure type bearing means comprising radial dynamic-pressure groove means having a predetermined groove configuration to generate a radial dynamic pressure in a radial direction of said shaft and axial dynamic-pressure groove means having a predetermined groove configuration to generate an axial dynamic-pressure in an axial direction of said shaft, said radial dynamic pressure groove means being formed in at least one of an outer circumferential surface of said shaft and an inner surface of said cylindrical member which are in opposed relation to each other and said axial dynamic-pressure groove means being formed in at least one of said upper surface of said disc-like plate and a surface of said plate means disposed in opposed relation to said upper surface of said disc-like plate, wherein said disc-like plate is encased in a cylindrical hole formed at an upper portion of said cylindrical member and a diameter of said cylindrical hole is determined so that a gap is formed between an inner circumferential surface of said cylindrical hole and an outer circumferential surface of said disc-like plate which are in opposed relation to each other, a thickness of said disc-like plate being determined so as to satisfy a condition of the thickness of said disc-like plate > said gap × 20.

19. A motor as claimed in claim 18, wherein said bearing means further comprises second axial dynamic-pressure groove means having a predetermined configuration to generate an axial dynamic pressure, said second axial dynamic-pressure groove means being formed in at least one of a lower surface of said disc-like plate and a bottom surface of said cylindrical hole which are in opposed relation to each other.

20. A motor as claimed in claim 18, wherein said rotor magnet is arranged such that its magnetic suction force is used as a back pressure opposite to the dynamic pressure in the axial direction.

21. A motor as claimed in claim 20, wherein said rotor-magnet is disposed such that its magnetic center is shifted from a magnetic center of said armature in axial directions of said shaft to generate the back pressure against the axial dynamic pressure.

22. A motor as claimed in claim 20, further comprising a magnetic member disposed at a vicinity of said rotor magnet whereby the magnetic suction force of said rotor magnet with respect to said magnetic member acts as the back pressure against the axial dynamic pressure.

23. A motor as claimed in claim 18, wherein said axial dynamic-pressure groove means is arranged so that the axial dynamic pressure is generated in a ring.

24. A motor as claimed in claim 18, wherein said axial dynamic-pressure groove means has a concave portion to keep an oil.

25. A motor as claimed in claim 18, wherein said axial dynamic-pressure groove means is arranged so that a center of the axial dynamic pressure generated is coincident with an axis of said shaft.

26. A motor as claimed in claim 18, wherein a portion or all portions of said shaft is made of a material greater in thermal expansion coefficient than that of said cylindrical member.

27. A motor as claimed in claim 18, wherein a portion or all portions of sliding surfaces of said bearing means are coated with a material having an abrasion resistance.

28. A motor as claimed in claim 18, wherein concave and convex portions of said groove means are formed by deposition of a structural material.

29. A motor as claimed in claim 18, wherein concave and concave portions of said groove means are formed by etching.

30. A motor as claimed in claim 18, wherein concave and convex portions of said groove means are formed by molding of a resin.

31. A motor as claimed in claim 18, wherein concave and convex portion of said radial dynamic-pressure groove means are formed by transferring a predetermined pattern to a surface of said shaft with said shaft being rolled by a device having said predetermined pattern on its surface.

32. A motor as claimed in claim 18, wherein an oil-repellent material is applied around said radial dynamic-pressure groove means and said axial dynamic-pressure groove means so as to prevent leakage of lubricating oil comprising a fluorine component provided in said groove means.

33. A motor as claimed in claim 18, wherein lubricating oils for said radial dynamic-pressure groove means and said axial dynamic-pressure groove means are made of the same material.

34. A motor as claimed in claim 18, wherein a portion of said base and a portion of said cylindrical member are constructed to be engaged with each other so as to form a labyrinth type seal.

* * * * *